DATA READING SYSTEM

Filed Oct. 10, 1967 2 Sheets-Sheet 1

INVENTOR.
DAVID C. PRINCE

BY

Eliot S. Gerber

ATTORNEY

INVENTOR.
DAVID C. PRINCE
BY
Eliot S. Gerber
ATTORNEY

United States Patent Office 3,463,289

Patented Aug. 26, 1969

3,463,289
DATA READING SYSTEM
David C. Prince, 3009 P St. NW.,
Washington, D.C. 20007
Filed Oct. 10, 1967, Ser. No. 674,223
Int. Cl. B41j 3/516, 3/16
U.S. Cl. 197—1 4 Claims

ABSTRACT OF THE DISCLOSURE

A paper is prepared to be read by a code reading machine. The paper is typed on a typewriter having fonts consisting of symbols, such as characters, and the code representing that symbol. The typing occurs on the front face of the paper, with or without the conventional carbon ribbon. A carbon paper having magnetic material is positioned face-up facing the back side of the type paper. The code is printed, by the typewriter, as raised carbon printed areas on the back of the sheet. The sheet may then be formed into a tape.

The present invention relates to data systems and more particularly to a system for the reading of information typed on paper.

The number of typed documents increases every year. Many of these documents must be "letter perfect" in the sense that the typing must be without spelling, typing or spacing errors. Usually this requires that the document go through a number of drafts, each of which is proof-read. In addition, the final copy must often be retyped and proof-read since the typist may make additional spelling or typing errors.

There have been a number of proposed solutions in an attempt to save the time and cost of typing and proof-reading typed documents. One such solution is the "Selectronic" system of International Business Machines. This system utilizes a magnetic tape cartridge. The magnetic tape is magnetized with a code which represents a symbol which is typed on a paper. The tape is magnetized with its code at the same time that the symbol is typed. In order to make a correction, it is necessary to erase, i.e., demagnetize, the code from the tape. The final letter is automatically typed by an electric typewriter which operates under the control of the magnetic tape cartridge. This device may also be used to type a predetermined repeating text. In the work of lawyers and many others there are many phrases, paragraphs, and even sometimes whole pages, which are matters of form. These form portions of the text may be entered into the magnetic tape cartridge in code and repeated at will. This saves the time of typing and proof-reading each of the predetermined text portions. However, the "Selectronic" device is relatively expensive so that it is economical only under special circumstances.

The problem of cost associated with typing has also been sought to be solved by other devices which use a code separated from the original typed paper. These other devices place the code, in the form of punches, on a separate paper tape. These devices are now being manufactured, for example, under the name "Flexowriter" by Friden, Inc. (division of the Singer Company).

These paper tape devices are intended for those situations having repetitive typed texts in which the amount of new text material is relatively small. The cost of the paper tape devices is lower than that of the "Selectronic," but they are still expensive.

Ordinary typed material is not suitable for direct input into a computer or other data processing devices. Data processing equipment usually requires that its input be in the form of digital "bit-no bit" code. The conversion of typed material to the digital code usually takes place, at the present time, by means of operators punching cards or magnetizing tapes by means of manually operated punch card or tape-making machines. This process is costly and relatively slow. In addition, there is a possibility of error in transcribing the symbols of the typed material into the holes of the punch card or the bit magnetization of the magnetic tape.

The problem of transcribing data into a usable digital form has been sought to be solved by the utilization of optical reading devices. Such optical reading devices use complex electronic and optical systems to determine that a certain symbol is represented by a certain code. Such reading devices usually put out, as their product, punched cards or magnetic tape. Optical reading devices may also be used for the sorting and physical processing of goods according to the addresses on the goods. For example, optical reading devices may be used to sort letters, packages and checks. These optical reading devices, however, often require a special type or printed font which is particularly adapted for the optical reading device. Even with such special fonts, the accuracy of these devices is not high. Optical reading devices are expensive.

It has also been suggested that the typed letters themselves may be magnetized in certain portions so that the symbols may be converted into code. This suggestion, however, has not proven to be commercially feasible.

It is thus seen that the previous efforts of separating the code from the symbols and placing the code on a separate paper or magnetic tape have resulted in costly devices. The attempt to directly read the symbols themselves has resulted in devices which have failed or which are very costly.

My previous United States Patent 2,897,267 suggested that a data system could employ letter and numerical symbols with the code representing the symbols positioned underneath the symbols. The code is magnetizable and visible. This system has the advantage of producing text which is readable by the typist (or others) who may read the symbols and by the magnetic pick-up head which "reads" the code. The text is readily correctable by erasure and retyping. However, this system has certain inaccuracies due to "drop-out," in which the pick-up head fails to detect the presence of a bit. In addition, the text produced does not present a clean appearance due to the presence of the code.

It is the objective of the present invention to provide a method for the machine reading of typed documents, which method utilizes equipment which is relatively low in cost.

It is a further objective of the present invention to provide a method of reading typewritten material in which the equipment used is adapted for other purposes and particularly for the ordinary typing of non-code documents and also as the print-out device of a data reading system.

It is a further objective of the present invention to provide a fast and simple method of correcting typed coded documents so that the corrected text may be utilized by a machine to produce a final typed original of the corrected document.

It is a further objective of the present invention to provide a method of repeating predetermined portions of text automatically under the control of an operator, in which process the operator may manually type in additional portions of text.

It is another objective of the present invention to provide a simple and low-cost method of sorting goods such as letters, packages and checks.

It is a further objective of the present invention to provide a method in which typed documents may be read by a machine for subsequent or simultaneous communication of the information on the documents to a receiving machine.

In accordance with the present invention, a code is provided which is associated with each of the normal alphabetical and numerical symbols. This code may be any of the usual digital "bit-no bit" codes used in communication or computer systems, for example, the 5-bit code used in teletypewriters, or 6, 7 or 8-bit codes.

The present invention provides a method of typing documents using symbols and their associated code in which the code is raised slightly from the surface of the paper. When the paper is passed relative to a magnetic reading head, with the paper moving and the head remaining still, or vice versa, the magnetic bits will be successfully and accurately read by the head. The bits which are raised slightly above the level of the paper come sufficiently close to the pick-up head so that the induced, or permanent, flux of the magnetic bits is detected by the magnetic reading head. The problem of "drop out" is alleviated and greater accuracy in the reading of the code is obtained. This result is obtained by printing the code on the back side of the paper using a sheet of carbon paper impregnated with magnetic material. The present invention also contemplates the use of a special backing sheet having stripes of magnetic carbon material, which stripes face the back of the original typed paper sheet. The stripes are accurately positioned so that the code will be copied onto the back of the sheet and the symbols will not be copied.

The paper of the present invention is preferably in the form of an elongated roll having pin holes at its sides for alignment and having elongated perforations so that it may be cut into ribbon-like tape (stripes) for reading by a paper tape reading machine.

In one embodiment of the present invention, the symbols (characters of letters and numerals) are reversed on the typewriter key type font along with the reversal of the code. The reversed typewriter key fonts, when used with a front sheet and backing carbon sheet having magnetized or magnetizable particles, provides a raised normal set of symbols and code on the back of the front sheet. The front sheet may be a sticker whose back provides a raised magnetic code for sorting and whose front has a glue material. The sticker may be applied, for example, to letters, packages and checks and to various articles for automatic warehouse operations.

Preferably the special code and symbols fonts of the present invention are the raised portions of a ball-like typing element. The special typing element may be easily replaced by a conventional typing element to do other typing work or so that the same typewriter, with modifications, may be used as the print-out device of a code reader.

Other objectives will be apparent from the detailed description of preferred embodiments of the present invention, which should be taken in conjunction with the accompanying drawings. In the drawings.

Figure 7:
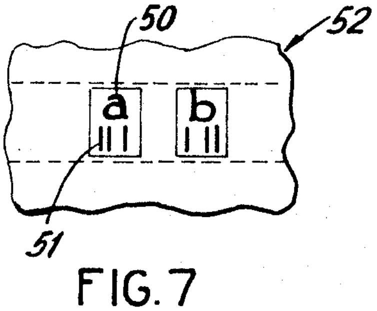
FIG. 7 is a top plan view of two typewriter fonts and their associated code.
Figure 8:
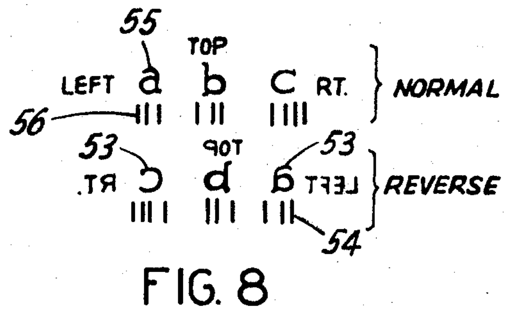
Figure 9:
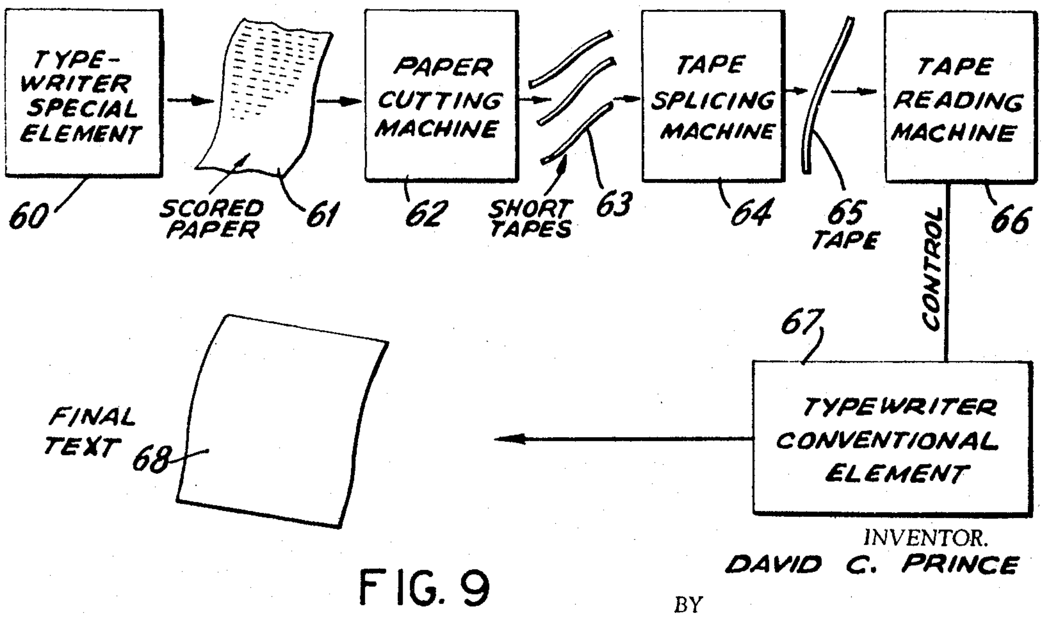

FIG. 8, at the top portion, shown the normal symbols and their associated code and, at the bottom portion, shows the reverse of those normal symbols and their associated code, the reverse symbols and code being produced by the sort of typewriter key fonts illustrated in FIG. 7; and FIG. 9 is a block diagram showing the system of the present invention.

Figure 1:
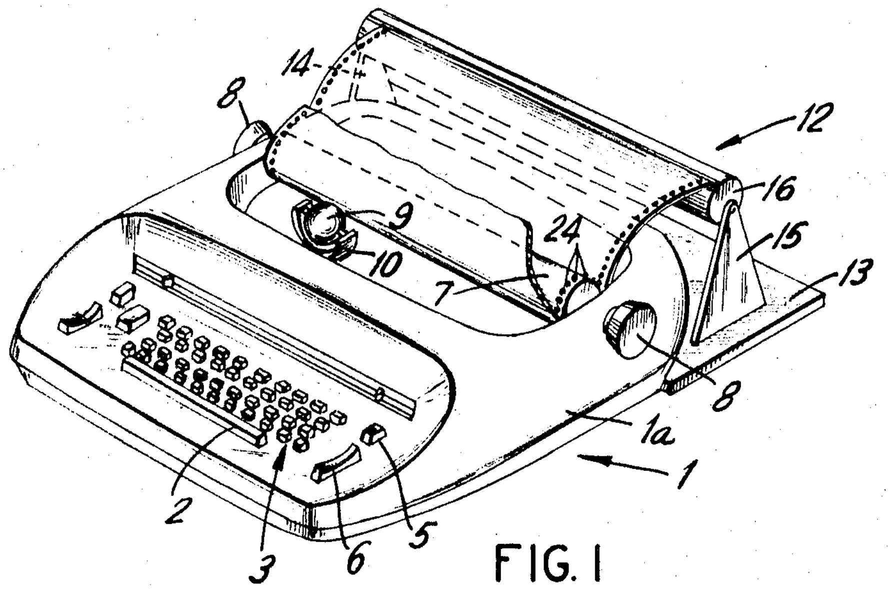
FIG. 1 is a perspective view of a typewriter and its associated paper-feed device utilized in the present invention.

The typewriter which is preferred for utilization in the present invention is the form of typewriter in which the typing element is readily replaceable. This form of typewriter, at the present time, is made only by the International Business Machines Company under the name "Selectric." The typewriter, shown in FIGS. 1 and 2, includes a base 1*a*, a spacer bar 2; a plurality of keys 3 each of which represents a letter symbol or a number symbol, a key for capital letters, keys for special symbols such as periods, commas, etc.; and other keys 5 and 6 for back spacing and margin setting. The typewriter 1 also includes a rotatable motor-driven platen 7 having knobs 8 at both of its ends. The typing is accomplished by means of a round ball-like element 9, called a "typing element."

The typing element is rotatable in its carriage 10 for a full 360-degree rotation. In addition, the typing element 9 is tiltable at three different angular levels from its vertical axis. In this manner it is possible to arrange four levels of typing fonts on the typing element. Each lower case symbol, upper case symbol and special symbol has its own position on the typing element 9. One level of the fonts on the typing element is at the normal axis and the other three levels are at the various angular tilt positions. The typing occurs by the typing element being rotated and tilted until the correct font (symbol) is in the foremost position of the element in regard to the paper being typed upon. The typing element 9 then strikes the paper through a carbon or plastic ribbon. The position of the paper is changed, in its vertical position from line to line, due to the motor-driven platen 7. The platen 7 is rotated for one space, or more, at the end of each line. Unlike ordinary typewriters, the carriage in the "Selectric" typewriter does not move horizontally relative to its base. The horizontal positioning of the letters occurs due to the horizontal movement of the typing element carrier 10. The usable speed of the "Selectric" typewriter is given as 180 words per minute. The line space may be set from 3 to 6 inches per inch.

The particular usefulness of the "Selectric" typewriter in the system of the present invention arises from the fact that the typing element 9 is readily and easily changed. This means that the typewriter can be used for ordinary typing work using a conventional symbol element, and can be used for data recording in accordance with the systems of the present invention, using one, or more, other and different typing elements. The typing element can then be changed and the typewriter element with the conventional symbol fonts can be used as the print-out device for the reading machine, which is described subsequently.

Figure 2:
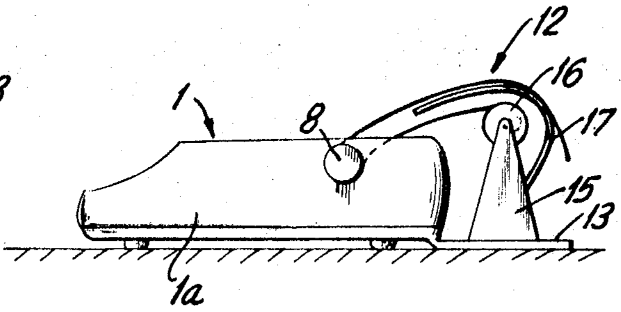
FIG. 2 is a side view of the typewriter and paper-feed mechanism shown in FIG. 1.

A paper-feed mechanism 12 is provided at the rear of the typewriter 1. The paper-feed mechanism 12 includes a base 13, two side arms 14 and 15, and a rotatable shaft 16. The rotatable shaft 16 is supported at its ends, preferably in bearings, by the arms 14 and 15. The shaft 16 is removable from the arms, for example, by clips, so that a roll of paper may be placed on the shaft 16. A raised curved guide plate 17, shown in FIG. 2, is attached preferably to the arms 14 and 15. The guide plate 17 causes the paper fed back from the top of the platen 7 of the typewriter to fall behind the paper-feed mechanism 12. The guide plate 17 is omitted from FIG. 1 and is shown in FIG. 2 so that the FIG. 1 mechanism may be more clearly illustrated.

Figure 3:
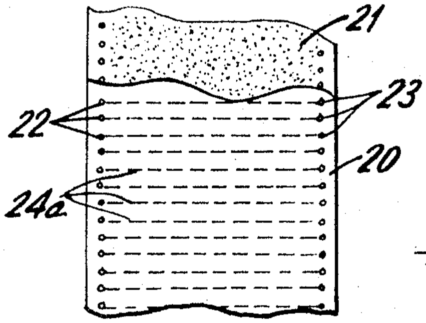
FIG. 3 is a top plan view of a portion of the elongated roll of paper used in connection with the typewriter and paper-feed device shown in FIGS. 1 and 2.

One of the special papers used in the system of the present invention is illustrated in FIG. 3. The paper consists of a front sheet 20 of readable paper, such as white or yellow cellulose stock paper. A sheet of carbon paper 21 having magnetized or magnetizable finely divided particles mixed with its carbon black particles is positioned next to the front sheet 20. The carbon paper 21 has its carbon face upward towards the back side of the front sheet 20. An impression made on the front of the front sheet 20 will result in a magnetized or magnetizable visible marking of the back of the front sheet 20 caused by the carbon paper 21. Preferably the carbon paper 21 is temporarily held in its position next to the front paper 20 by means of a separate glue line along its side edges. A series of small holes 22 and 23 are provided at the opposite sides of the front paper 20 and through attached carbon paper 21. These holes 22 and 23 are utilized by locking pins 24 which are attachable in holes at the sides of the platen 7 of the typewriter 1. The pins 24 on the platen 7 cooperate with the holes 22 and 23 to accurately position the paper in its vertical and horizontal alignment relative to the typing element 9.

The front paper 20 has a plurality of horizontal parallel score marks 24*a*. These score marks enable the paper 20 to be torn readily into thin elongated tape (ribbon-like) pieces. Preferably the pin holes 22, 23 come between the lines of typing, i.e., at the score lines. The score lines may be omitted, as an alternative, and the paper 20 utilized in a code reading machine which reads sheets of paper.

One of the problems which has been presented in the use of code which is directly typed onto a paper document, along with the symbol which the code represents, is that the typing impresses the magnetic material into the paper. This makes it difficult for the magnetic reading head to correctly and accurately pick up, i.e., detect, the presence of every magnetic bit. The magnetic reading head is responsive to the induced, or permanent, flux of the magnetic material printed or typed on the paper. When the magnetic bits are typed on paper, the gap between the magnetic material and the reading head is increased in an erratic manner, and the gap is greater than the gap between the magnetic reading head and the paper. This has caused a problem known as "drop out," in which inaccuracies occur because of the failure of the magnetic reading head to pick up the presence of magnetic bits. The raised typed carbon copy on the back of the front sheet 20 is designed to solve the "drop out" problem.

Figure 4:
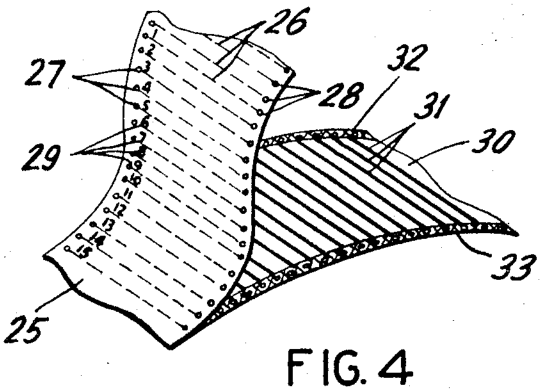
FIG. 4 is a second embodiment of the elongated paper used in connection with the typewriter and paper-feed device of FIGS. 1 and 2.

An alternative construction of the paper illustrated in FIG. 3 is shown in FIG. 4. In the paper of FIG. 4 the front sheet 25 is of visible typable paper, preferably of white cellulose stock. As in the previous embodiment, it has a plurality of parallel score lines 26 and a plurality of left 27 and right 28 pin holes. In this embodiment, however, the front shet is provided with a series of vertical numbers 29, preferably at the lefthand side of the sheet, which provide a guide so that, after the sheet is torn into tapes, the tapes may be readily kept in order or replaced.

In the embodiment of FIG. 4, instead of the carbon sheet 21, the facing sheet 30 has a plurality 31 of narrow strips of a mixture of magnetic or magnetizable particles and carbon material. The striped sheet 31 is positioned next to the paper sheet 25 by means of glue strips 32 and 33 aligned along the edges of the stripe sheet 30. The carbon stripes on the strip sheet 30 are very narrow. The stripes are aligned relative to the paper 25 so that only the code (and not the symbols) are printed on the back of the sheet 25. For this purpose the carbon strips should be no higher than 7-point type font. The stripes occur on the bottom of the usual line space so that the code beneath the symbols are printed on the back of the front sheet.

Figure 5:
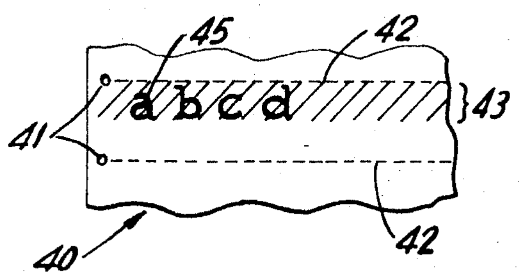
FIG. 5 is a top plan view of the front face of a portion of a third embodiment of a suitable paper.
Figure 6:
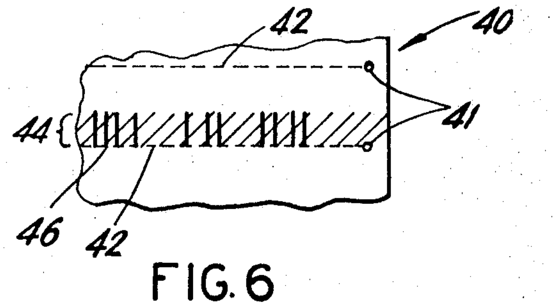
FIG. 6 is a top plan view of the rear side of the paper shown in FIG. 5.

The paper 40 shown in FIGS. 5 and 6 consists of a single sheet of paper having a series of side pin holes 41 near both of its side edges. The paper 40 has parallel horizontal score lines 42 so that it may be easily torn, along the score lines, into tape (ribbon-like) pieces. The front of sheet 40, shown in FIG. 5, includes stripes of a special coating 43 (shown in light cross-hatched lines). The stripes are positioned across the top of each of the spaces formed between the score lines 41. The coating 43, when pressure is applied, becomes visible or changes color. One sort of suitable coating consists of a vast number of microscopically small cells enclosing chemically reactive liquids. When the cells are ruptured, by pressure from a typewriter key, the liquids mingle and react, producting a visible indication. This sort of coating is manufactured by the National Cash Register Company, Dayton, Ohio, under the name "NCR—No Carbon Required." The reverse back side of sheet 40, shown in FIG. 6, has a stripe 44 of the same coating at the bottom of the space between each pair of the score lines 42. In typing, the ribbon is removed and the typewriter keys strike directly on paper 40. The typewriter key has conventionally aligned symbols and reversed code underneath each of the conventional symbols. The keys produce a visible symbol 45 on the front of the sheet 40 and a visible code 46 on the back of the sheet 40. The symbols, preferably in 8-point type font, are readable by the eye and the code is readable by optical code reading equipment. The front of the sheet presents a clean appearance and the back of the sheet is free of symbols, which, if present, may cause errors in the machine reading of the code.

The special typewriter fonts, illustrated in connection with FIGS. 7 and 8, are particularly adapted for an automatic sorting process. The typewriter font, shown in FIG. 7, is preferably positioned on a ball-type typing element 52. The symbol 50 is in 7 or 8-point type and its code 51 is about the same size. The symbol 50 and code 51, together, occupy the same space on the typing element as the usual symbol. The symbols 50 and 51 are reversed (backward) on the typing element compared to the conventional alignment. When typed on the front of ordinary paper, using a conventional typewriter ribbon, the reversed symbols produce a reversed (backward) impression 53, see FIG. 8. The code 51 is also produced backwards 54. The special font is adapted for use with a carbon paper having magnetized or magnetizable particles. The special carbon paper is placed face-up against the paper being typed upon, with or without using a ribbon in the typewriter. The carbon paper produces a readable "normal" raised version of the typed text, with the symbols 55 and code 56 being correctly and normally aligned. Preferably the paper is a sheet having score lines, so that it may be cut into tapes. Alternatively, the paper is a sticker. The sticker has, on its front face, a glue material, such as wettable glue stripes around its edges. The sticker, after being typed, is glued to a document, envelope or package with the raised carbon paper produced text showing on its face. The code on the sticker may be read by a magnetic pick-up head for sorting of the document, letter or package. The stickers may be prepared, with the return name, bank and amount, by firms sending out bills and invoices. The payer would affix the sticker to his check and sign the check.. The code would enable the check to be automatically sorted and the proper accounts automatically entered.

The operation of the system of the present invention is illustrated in FIG. 9. The original input device is a typewriter 60, preferably of the IBM "Selectric" form. The typewriter 60 has a special ball-like typing element having symbols and their associate code, as described above. The typewriter 60 produces a paper 61, preferably having score lines. The back of the paper 61 has raised visible magnetic or magnetizable code and the front has visible characters. The code is produced by using a backing sheet of special carbon paper whose carbon face faces the back of sheet 61. The sheet 61 is cut, along the score lines, into ribbon-like tapes by the paper cutting machine 62. The machine 62 may be similar, in construction, to a mimeograph machine. The paper 61 and the drum is revolved past a blade which moves in steps parallel to the axis of the drum. Alternatively, the paper 61 may be unscored and cut in other ways. For example, the paper 61 may be (1) placed on a drum and rotated past a plurality of fixed cutting knife edges; (2) placed on a table and cut by descending fixed parallel blades; or (3) moved into the path of a motor driven elongated blade whose descent is timed by the leading edge of the sheet contacting a proximity pick-up device.

The cutting machines 62 produces a group of short tapes 63. The ends of the short tapes are joined, for example, by glue, in a splicing machine 64. The splicing machine 64 produces an elongated tape 65 having raised magnetic or magnetizable code on its face and characters on its front face. The tape is placed on a reel and the reel inserted in a reading machine 66. The reading machine 66, which may be of the type described in my aforesaid U.S. Patent 2,897,267, converts the code into electrical signals. The electrical signals operate a conversion device such as is utilized in teletypewriters to operate the keys of a typewriter. The code is converted, in effect, into control pulses for the solenoid operation of keys. Preferably the typewriter 67 is the same machine as typewriter 60, but with its typing element changed to a conventional typing element having only symbols, i.e., without code, in 10 or 12 point type. The typewriter 67 produces the final text 68.

Corrections may be made and repetitive text may be inserted by cutting the incorrect portions out of the paper or the tape. The desired portions, which are readable tapes on their front faces, are spliced into the body of the tape 65 before the tape 65 is placed on the reel.

Modifications may be made in the present invention within the scope of the subjoined claims. For example, the tape reading machine 66 may be an optical code reader. As another example, a special font may be used, operable by the back-space key, which produces all bit (black) code spaces. The reading machine ignores the corrected symbol and picks up the next one.

I claim:

1. The method of converting information consisting of the steps of typing the information on a sheet of paper in a plurality of lines, said step of typing being done with a typewriter having a raised font consisting of a plurality of symbols and unique coded representations of said symbols physically contiguous to the respective symbols, said step of typing providing visible typed symbols on the front of said sheet and visible coded representations of the typed symbols on the back of said sheet, cutting said sheet of paper into elongated pieces to form short tapes, each short tape having a line of symbols on one side and a corresponding line of coded representations of the same symbols on the other side, joining the ends of said short tapes to form an elongated tape that includes a plurality of lines of the typed information on said sheet of paper; reading said visible code representations on said elongated tape in a reading machine which converts the code into electrical signals, and utilizing the said signals to operate a typewriter to produce a final copy of the information having only symbols.

2. The method of claim 1 wherein said sheet includes a set of parallel stripes of a pressure responsive coating on its front face and a second set of parallel stripes of a pressure responsive coating on its back face, the stripes on said front face being parallel to and above the parallel stripes on said back face, wherein said coatings change color or become visible under the pressure of being typed upon.

3. The method of claim 1 wherein the code is deposited on the back of said paper by means of a sheet of carbon paper whose carbon face is removably positioned next to the back of said sheet, the carbon paper including transferable magnetized or magnetizable particles on said carbon face.

4. The method of claim 3 wherein said carbon paper is a sheet of paper having thin parallel stripes of carbon having said magnetized or magnetizable particles, the stripes being positioned relative to the front sheet so that only the code appears on the back of said front sheet.

References Cited

UNITED STATES PATENTS

| | | | |
|---|---|---|---|
| 2,114,294 | 4/1938 | Green | 197—1 |
| 2,784,392 | 3/1957 | Chaimowicz | 197—1 |
| 2,788,879 | 4/1957 | Rand | 197—1 |
| 2,791,310 | 5/1957 | Jones | 197—1 |
| 2,811,235 | 10/1957 | Geissler | 197—1 |
| 2,994,428 | 8/1961 | Daubendick | 209—111.8 |
| 3,040,323 | 6/1962 | Brenner et al. | 209—111.8 XR |
| 3,097,745 | 7/1963 | Leo | 209—111.8 |
| 3,141,404 | 7/1964 | Newman | 101—149.2 |
| 3,294,956 | 12/1966 | Jenkins et al. | 197—1 XR |
| 3,309,711 | 3/1967 | Sorrells et al. | |

OTHER REFERENCES

IBM Technical Disclosure Bulletin, vol. 2, No. 5, February 1960, article by L. D. Green et al. entitled, "Simultaneous Typing and Magnetic Printing," p. 31 only relied upon.

EDGAR S. BURR, Primary Examiner

U.S. Cl. X.R.

101—2; 209—111.8